United States Patent [19]

Giese et al.

[11] Patent Number: 4,617,077
[45] Date of Patent: Oct. 14, 1986

[54] BLOW MOLDING PROCESS

[75] Inventors: Peter Giese; Rainer Holzmann; Hans-Joachim Schwochert, all of Bonn; Alfred Thomas, Dambroich, all of Fed. Rep. of Germany

[73] Assignee: Kautex-Werke Reinold Hagen AG, Bonn, Fed. Rep. of Germany

[21] Appl. No.: 781,435

[22] Filed: Sep. 27, 1985

[30] Foreign Application Priority Data

Sep. 28, 1984 [DE] Fed. Rep. of Germany ....... 3435592

[51] Int. Cl.$^4$ .................. B29C 49/46; B29C 49/20
[52] U.S. Cl. .................... 156/245; 156/156; 156/244.14; 156/497; 264/83; 264/516; 264/526; 264/528; 264/529
[58] Field of Search .................. 264/83, 85, 516, 523, 264/526, 528, 529, 537, 540; 156/156, 244.14, 245, 497; 425/72 R, 522

[56] References Cited

U.S. PATENT DOCUMENTS

| | | | |
|---|---|---|---|
| 2,811,468 | 10/1957 | Joffre . | |
| 3,647,613 | 3/1972 | Scotland . | |
| 3,862,284 | 1/1975 | Dixon et al. | 264/83 |
| 3,988,491 | 10/1976 | Dixon et al. | 428/288 |
| 3,998,180 | 12/1976 | Hawkins et al. . | |
| 4,020,223 | 4/1977 | Dixon et al. | 428/224 |
| 4,081,574 | 3/1978 | Hawkins et al. | 427/237 |
| 4,142,032 | 2/1979 | D'Angelo | 526/43 |
| 4,336,015 | 6/1982 | Rainville | 425/74 |
| 4,394,333 | 7/1983 | Fukushima et al. | 264/37 |
| 4,396,567 | 8/1983 | Rainville | 264/83 |
| 4,536,266 | 8/1985 | Bliefert et al. | 204/159.18 |

FOREIGN PATENT DOCUMENTS

| | | |
|---|---|---|
| 0063378 | 4/1982 | European Pat. Off. . |
| 2738382 | 3/1978 | Fed. Rep. of Germany . |
| 2644508 | 1/1979 | Fed. Rep. of Germany . |
| 2924797 | 1/1980 | Fed. Rep. of Germany . |
| 3027531 | 5/1982 | Fed. Rep. of Germany . |

Primary Examiner—Jan Silbaugh
Attorney, Agent, or Firm—Panitch Schwarze Jacobs & Nadel

[57] ABSTRACT

In producing hollow bodies by blow molding from thermoplastic material, a preferably tubular preform is firstly formed, and is then expanded within the blowing mold under the effect of an inert gas under high pressure, until it bears entirely against the inside surface of the blowing mold. Thereafter, a reaction gas such as fluorine is introduced into the hollow body under a considerably lower pressure, while the hollow body is still in the mold, to treat the internal surface of the hollow body to render it impervious to gas and/or liquid. After the reaction has elapsed, a flushing and cooling gas is introduced into the hollow body and is then removed from the blowing mold after the hollow body has sufficiently set.

15 Claims, 7 Drawing Figures

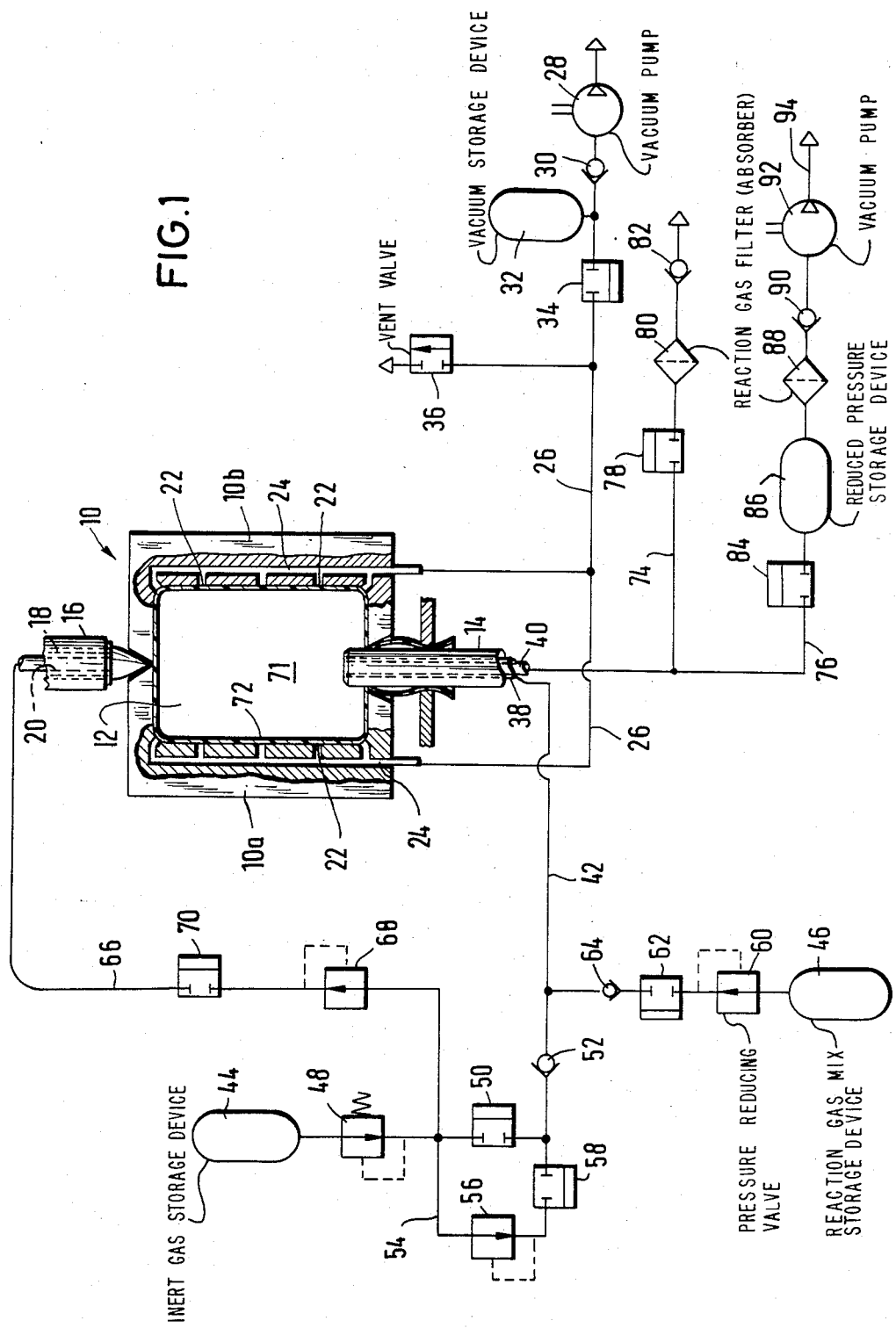

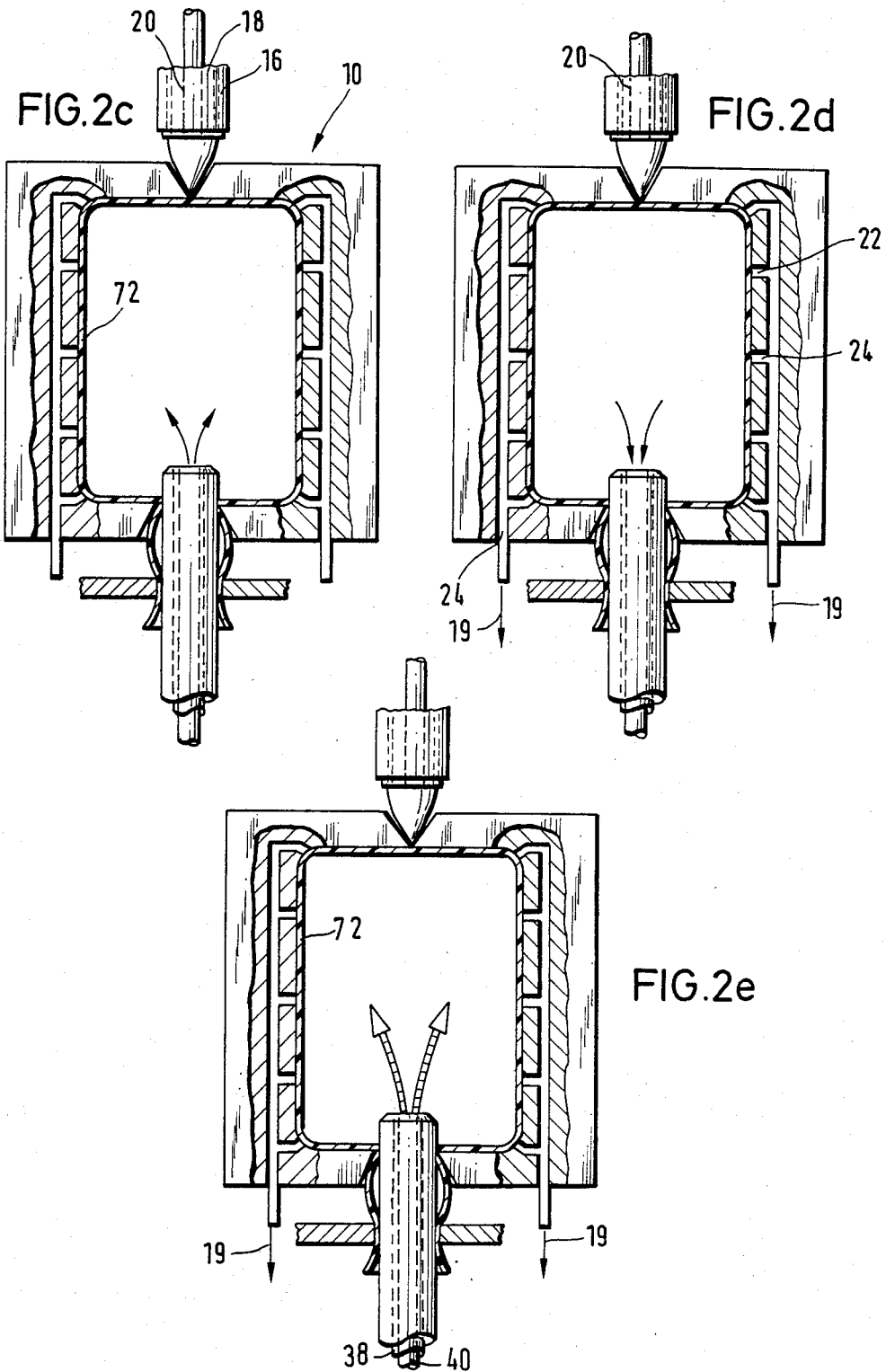

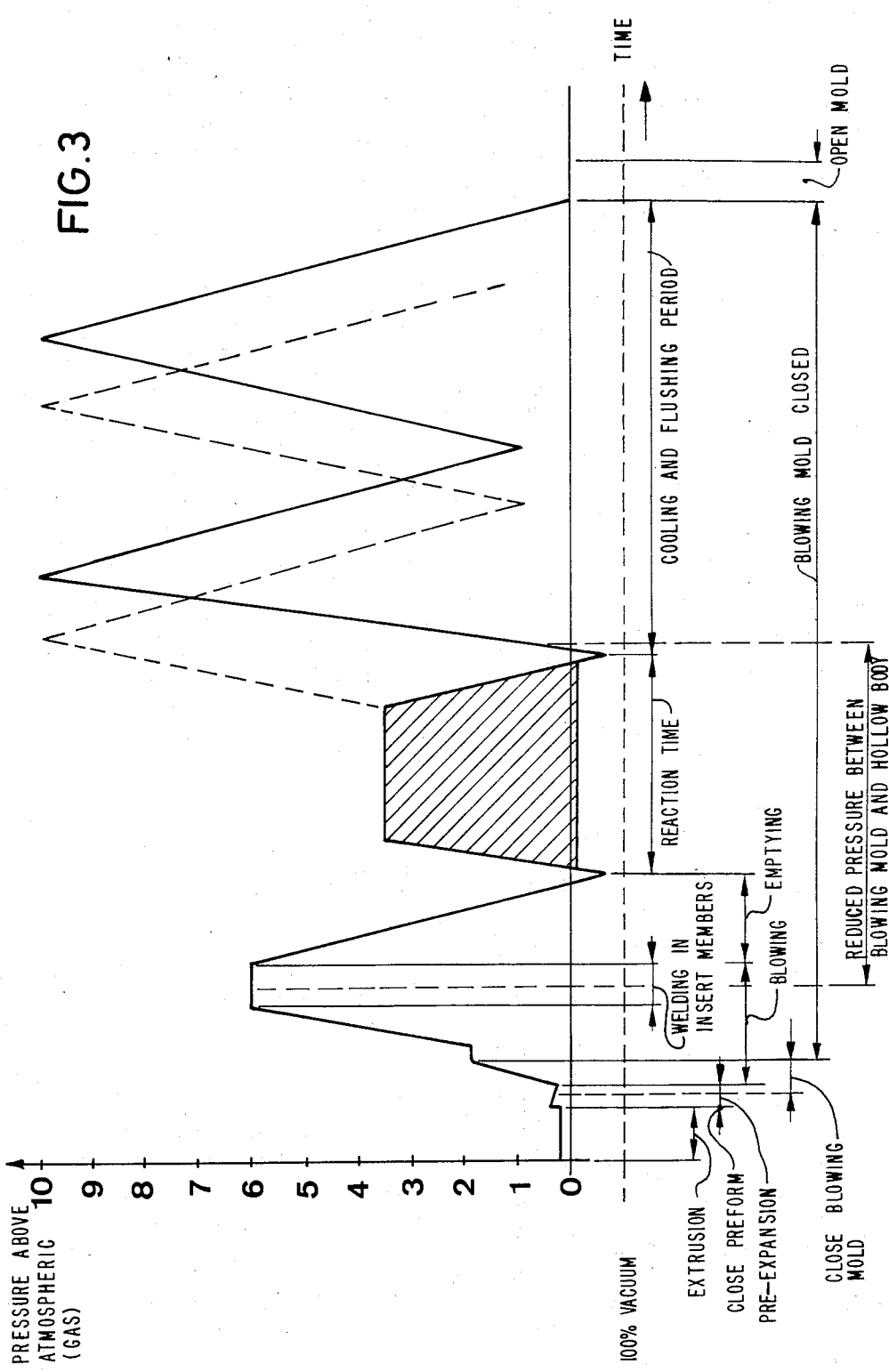

BLOW MOLDING PROCESS

BACKGROUND OF THE INVENTION

The invention relates generally to a blow molding process and more particularly a process for the production of a hollow body of thermoplastic material by blow molding.

A process for producing a hollow body from thermoplastic material by blow molding is disclosed in German patent specification No. 2 401 948, wherein a tubular perform is expanded within the closed blowing mold, so as to cause it to bear inside the inside configuration of the mold, by the introduction of a gas mixture which contains an inert gas. The inside surface of the resulting hollow body within the blowing mold is treated to render the wall of the hollow body impervious to fluid, and that operation is effected by means of a reaction gas which is also introduced into the hollow body in the closed mold, as a contituent of the gas mixture containing the inert gas. The reaction gas contained in the gas mixture used is fluorine. Thus, the gas mixture in that process performs two functions: on the one hand it provides for putting the preform into the required shape of the molded article, such as a container or the like, while at the same time it provides for treating the inside wall surface thereof. The first function requires operation to be carried out under comparatively high gas pressure; in many cases, particularly when producing hollow bodies which are of a thick-wall nature and which are also of a complicated configuration, the gas pressure used may be 8 to 10 bars and even higher. However, as the reaction gas which is to be used for producing the desired reactions at the inside wall surface of the hollow body are all such as to give rise to severe environmental pollution, the fact that the process is carried out with elevated pressures means that it is necessary to take particular precautions in order to avoid the danger of environmental pollution, for example in the event of a defective blowing operation which cannot always be avoided when hollow bodies are being produced by means blow molding. It should be appreciated that the danger of environmental pollution arises to an even greater degree by virtue of the fact that, to achieve economical production, the gas mixture which performs the two functions indicated above must be continuously exchanged, within the hollow body, in order in that way also to cool the hollow body in its interior. Furthermore, the fact that operation is carried out under elevated pressure means that a large amount of reaction gas is required for properly performing the process.

In another blow molding process, as disclosed in German laid-open application (DE-OS) No. 29 24 797, the process comprises using a hollow perform of thermoplastic material, the reaction gas being introduced into the preform before the preform is put into the blowing mold, with the aim of causing the desired reaction to take place at the inside wall surface of the preform before the operation of expanding the preform, which is then carried out by introducing into the hollow body, within the blowing mold, a special compressed gas which does not contain any reaction gas. Besides affording the possibility of using the gas mixture containing the reaction gas for also pre-expanding the preform outside the blowing mold, which is conventional practice or even necessary in many situations, the above-indicated process also makes it possible to use a lower pressure for treating the preform and for the pre-expansion operation which may be required. The volume which is to be filled by the reaction gas mixture is lower, even in the pre-expansion operation, than in the first known process discussed above. However, it is not possible to exclude the occurrence of other disadvantages, for example the inner layer of the wall of the hollow body, upon which the reaction gas acts, is subjected to a stretching effect, in the operation of definitively shaping the molded article within the blowing mold, such stretching effect corresponding to that which the preform experiences overall in the final and definitive expansion operation. Such stretching of the inner layer of the wall of the hollow body occurs even when the preform has been subjected to pre-expansion, in the above-indicated manner. It is difficult if not impossible to cause the stretching effect to be uniform over the entire inside wall surface of the hollow body. As such stretching necessarily also causes a reduction in the thickness of the wall of the hollow body, the layer of the wall of the hollow body which is acted upon by the reaction gas also experiences a corresponding variation in its thickness, the extent thereof depending on the degree of stretching that occurs. Because, as already stated, the stretching effect is not regular, the thickness of the inner layer of the wall of the hollow body is ultimately also irregular, in the finished article. It will be appreciated that, where the molded article is for example a container for gas or liquid, the wall of the container must be at least substantially impermeable thereto, and should preferably be completely fluid-tight. However, the impermeability of the molded article will depend on the thickness of the inner layer of the wall of the molded article which has been subjected to the treatment by the reaction gas in order to render it impervious to fluid, so that, in order to achieve the desired substantially and preferably completely impermeable wall for the molded article, the thickness of the inner layer which undergoes treatment by the reaction gas must be so selected that, even in a region in which the wall of the hollow body has been stretched to its greatest degree, the layer in question is still of adequate thickness to be impervious to fluid, on the finished product. That can have the result that in other regions of the wall of the article, the thickness of the layer is greater than that which is necessarily to be provided in order to achieve the desired effect. That means that the operation of treating the wall of the preform by the reaction gas becomes more expensive both in terms of time and cost, either due to the reaction gas requiring a longer period to act on the inner layer of the hollow body or due to the concentration of the reaction gas having to be higher, in comparsion with a process which involves treating the inside wall surface of the finished hollow body with the reaction gas. Added to that is the fact that the preform must be closed off within the blowing mold at at least one end but in many cases also in other regions thereof, by forming a welded seam at the appropriate location. The welding operation to close the preform is generally carried out at the same time as the operation of pinching off excess material from the preform. For that purpose, the components which form the blowing mold having pinching-off edge portions between which on the one hand excess material is pinched off and at the same time the above-mentioned welded seam is produced. It will be appreciated that the quality of the welding achieved is a factor of crucial significance in regard to the suitability of the hollow body for use as a blowing mold preform. The possibility cannot be excluded that, due to the inside wall surface of the preform being chemically affected by the reaction gas, the properties of the inside wall surface of the preform, which are significant in relation to the operation of producing the welded seam, may also be adversely affected. That may also be the case when the preform is subjected to a preexpansion step as in that case the operation of pinching off excess material and the operation of forming the welded seams are carried out only when the blowing mold is closed around the pre-expanded preform.

SUMMARY OF THE INVENTION

An object of the present invention is to provide a process for the production of a hollow body of thermoplastic material by blow molding, which does not suffer from the disadvantages of the above-discussed prior processes.

A further object of the present invention is to provide a process for producing hollow bodies of thermoplastic material by blow molding which can avoid using substantially elevated pressures.

Another object of the present invention is to provide a blow molding process which by virtue of its operation procedure substantially reduces the inherent risk of causing environmental pollution.

A still further object of the present invention is to provide a process for the production of thermoplastic hollow bodies by blow molding wherein a reaction gas used for rendering the blow molding impervious to fluid is brought into contact with the thermoplastic wall to be treated thereby under a substantially low pressure and only at a time at which any welding operations on the preform or a hollow body to be produced therefrom have been completed.

A still further object of the present invention is to provide a blow molding process involving introducing a reaction gas into an article to render it fluid-impervious, wherein the amount of reaction gas to be introduced is to be minimised without substantially increasing the amount of time required to produce a hollow body.

Yet another object of the present invention is to provide a process for the production of hollow bodies of thermoplastic material by blow molding, which can be carried out by equipment which is of great simplicity in regard to structure and handling.

These and other objects are attained in accordance with the teaching of the present invention in a process for the production of hollow bodies of thermoplastic material by blow molding, wherein a preform, which is preferably tubular, is initially expanded within a blowing mold using an inert gas under high pressure, whereby the preform is caused to bear completely against the inside configuration of the blowing mold. The high gas pressure used for initially expanding the preform is then reduced, and the inside wall surface of the resulting hollow body, within the blowing mold, is treated by introducing a reaction gas into the interior of the hollow body under pressure which is substantially lower than the pressure used for initially expanding the preform, the reaction gas being such as to react with the material forming the wall of the hollow body thereby to render it impervious to fluid. After the necessary reaction time, the reaction gas is replaced by a flushing and cooling gas which serves for removing as much as possible of the reaction gas constituents within the hollow body, and for cooling it.

The fact that the two functions relating to expanding the preform into the configuration of the hollow body on the one hand and subjecting the inside wall surface of the hollow body to treatment on the other hand are separated gives rise to advantages, namely that optimum operating conditions can be achieved for the operation of expanding the preform as, in that step in the process, the precautions and requirements which have to be taken into consideration in the step in which the reaction gas is caused to act on the inside wall surface of the hollow body in the blowing mold do not have to be taken into account. Further, at the end of the expansion process, the formation of all welded joints on the hollow body has been concluded so that the treatment with the reaction gas, which is then effected, does not have any effect on the quality of the welded seams as the material at the locations of the seams has not been subjected to the effect of the reaction gas at the time at which the seams are made. That also applies in regard to the possibility of fitting attachments or further portions or components to the hollow body, which frequently also comprise plastic material and which are joined thereto by welding in the course of the step of expanding the preform to give the hollow body. A comparatively high pressure is required for that purpose, which may be 10 bars and higher. In addition, the reaction gas which is introduced into the hollow body after it has been substantially emptied of expansion gas can be so introduced under a comparatively low pressure, with the advantage that, in the event of any leakages, in particular due to defects on the hollow body, any environmental pollution that may be caused by such escape of reaction gas remains slight. The fact that the reaction gas is introduced into the hollow body under a low pressure makes it possible to use a smaller amount of reaction gas, which further has an advantageous effect on the economy of the process. Furthermore, the fact that a reduced amount of reaction gas is employed means that the problems relating to supplying the gas to the blowing mold and removing the gas after the treatment of the inside wall surface of the hollow body within the mold are reduced.

In accordance with a preferred feature of the invention the internal pressure in the hollow body after expansion thereof may be reduced to a value below ambient air pressure, that is to say, generally atmosphereic air pressure, and at the same time a suitable reduced pressure may be caused to act on the exterior of the article, within the blowing mold. For that purpose, the walls of the blowing mold which define the mold cavity may be provided with apertures which are of such arrangement and dimensions that on the one hand air can be sucked away therethrough but without on the other hand plastic material from the wall of the hollow body also being sucked into the apertures. The reduction in the internal pressure in the hollow body to a value below the ambient air pressure is necessary when the reaction gas is introduced into the interior of the hollow body under a pressure which is lower than the ambient air pressure. That mode of procedure further enhances the advantages already referred to above, relating to the amount of reaction gas used being less when the pressure is lower, and the lower level of expenditure in regard to removing the gas from the blowing mold. In the case of defective hollow bodies which permit the reaction gas to escape through the wall thereof, the reaction gas, due to the suction effect on the outside of the hollow body but within the blowing mold, would only pass into the piece of equipment which produces the recuced pressure within the blowing mold, for acting on the exterior of the hollow body therewithin.

At the expiry of the period of time for which the reaction gas acts on the inside wall surface of the hollow body, the reaction gas can be substantially removed therefrom by a reduction in pressure before the flushing and cooling gas is introduced into the hollow body. The flushing and cooling gas may be air but it may also be an inert gas. A mode of operation of that nature is advantageous for the reason that in that case the gas mixture which has to be handled in a particular fashion in order to safeguard the environment is of comparatively small volume, that is to say, it is restricted to that amount which substantially corresponds to the volume of the interior of the hollow body.

However, it would also be possible to remove the reaction gas by introducing flushing and cooling gas, without having previously reduced the pressure of the reaction gas. In that case, all the reaction gas in the interior of the hollow body will be removed by the flushing and cooling gas, with the reaction gas being correspondingly diluted thereby.

In an advantageous embodiment of the process, the flushing and cooling gas is introduced into the hollow body under a pressure which is substantially higher than the pressure of the reaction gas and possibly higher than the pressure which obtains while the preform is being expanded to form the hollow body. In that operation, the flushing and cooling gas can be at least partially exchanged in the usual manner, in particular in order to enhance its cooling action, in such a way that a given proportion of the gas is continuously or intermittently removed from the hollow body and a correspondiong proportion of fresh gas is introduced thereinto. On the other hand, it is also possible for the pressure of the flushing and cooling gas to be reduced and increased again at intervals of time. That makes it possible to provide for substantial exchange of the heated flushing and cooling gas by fresh and cooler gas. On the one hand, that provides for a more intensive cooling action. On the other hand, residues of reaction gas can also be better removed from those parts of the hollow body which are outside the normal path of flow of the gas or which are only incompletely scavenged by the gas.

Further objects, features and advantages of the present invention will be more clearly apparent from the following description of a preferred embodiment thereof.

BRIEF DESCRIPTION OF THE DRAWINGS

FIG. 1 is a diagrammatic view showing a blowing mold with associated conduits for the gaseous agents used in the production of hollow bodies of thermoplastic material, FIGS. 2a through 2e show diagrammatic views of a blowing mold, partially in cross-section, in five successive stages in the production of a hollow body, and FIG. 3 is a simplified graph view showing a working cycle for the production of a hollow body, wherein the respective pressure acting on the preform and on the hollow body to be produced therefrom is plotted against time.

DESCRIPTION OF THE PREFERRED EMBODIMENT

Figure 2A:
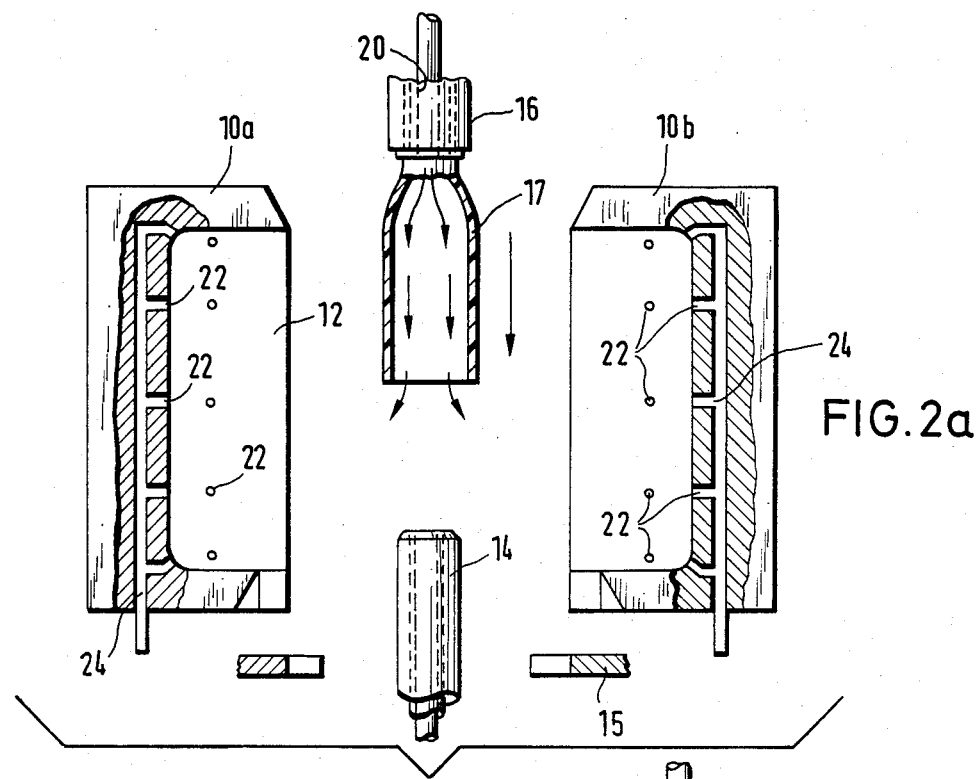

Referring therefore now to the drawing and more particularly to FIG. 1 thereof, apparatus for carrying out a process in accordance with the present invention comprises a generally twopart blowing mold as indicated generally at 10. Associated with the blowing mold 10 is a blowing mandrel 14 which extends upwardly into the mold cavity 12 between the two halves 10a and 10b of the blowing mold. The apparatus further comprises an extrusion head 16 of an extruder which has an annular discharge opening for the termoplastic material used, when producing a tubular preform. On its inside, the annular discharge opening is defined by a core portion 18 which is provided with a downwardly opening passage 20 for a gaseous medium. The two halves 10a and 10b of th blowing mold 10 are provided at their walls which define the mold cavity 12 with openings 22 which can be connected by way of duct systems 24 and conduits 26 to a vacuum source 28, for example in the form of a vacuum pump. The connecting line 26 includes a check valve 30, a vacuum storage device or accumulator 32, a shut-off valve 34 which can be actuated from the exterior and a vent valve 36.

The blowing mandrel 14 is provided with two axial ducts 38 and 40 which are disposed in substantially coaxial relationship with each other in such a way that the duct 38 which is of annular cross-section surrounds the duct 40. The duct 38 can be connected by way of a conduit 42 to an inert gas storage device 44 and to a reaction gas storage device 46. The communication between the inert gas storage device 44 and the duct 38 of the blowing mandrel 14 is by way of a pressure reducing valve 48, a shut-off valve 50 and a check valve 52 which permits inert gas to pass only in the direction from the storage device 44 towards the blowing mandrel 14. The arrangement also has a branch or by-pass conduit 54 for by-passing the shut-off valve 50. The conduit 54 also has a pressure reducing valve 56 and a shut-off valve 58.

The reaction gas storage device 46 can also be connected to the duct 38 in the blowing mandrel 14 by way of a pressure reducing valve 60, a shut-off valve 62 and a check valve 64 which permits the gas to pass only in a direction towards the blowing mandrel 14.

Finally, the inert gas storage device 44 can also be connected by way of a conduit 66 to the duct 20 in the core 18 of extrusion head 16, also by way of a pressure reducing valve 68 and a shut-off valve 70.

The duct 40 in the blowing mandrel 14 is provided for removing the respective gases or gas mixture from the interior 71 of the hollow body 72 in the blowing mold 10. For that purpose, the duct 40 can be connected to two condutis 74 and 76. The conduit 74 has a shut-off valve 78, a filter 80 which is in the form for example of a adsorber and a check valve 82, by way of which the conduit 74 and thus the duct 40 in the blowing mandrel 14 can be communicated with atmosphere.

The conduit 76 is also provided with a shut-off valve 84, a vacuum storage device 86, a filter 88, a check valve 90 and a vacuum pump 92, by way of the vacuum vent passage 94 of which a communication with atmosphere can be made.

Referring now to FIGS. 2a through 2e, the working cycle for producing a hollow body begins with the operation of extruding the preform 17, with the blowing mold 10 in an open condition. Irrespective of whether the operation of producing the preforms is a continuous or a batchwise operation, the preform 17 is internally flushed with an inert gas, for example $N_2$, in order to exclude the presence of oxygen within the preform and thus subsequently within the hollow body 72 to be produced therefrom, at least until the conclusion of the treatment with the reaction gas. The inert gas can be introduced into the preform 17 in per se known fashion by way of the conduit 66 and the duct 20, through the extrusion head 16. Generally, the mode of operation is such that, depending on the speed of extrusion, the amount of inert gas introduced into the preform approximately corresponds to three times the final volume thereof. Reference should be made to FIG. 2a showing an intermediate stage during production of the preform 17, while it will be seen from FIG. 3 that this phase is carried out with a slightly increased pressure.

Figure 2B:
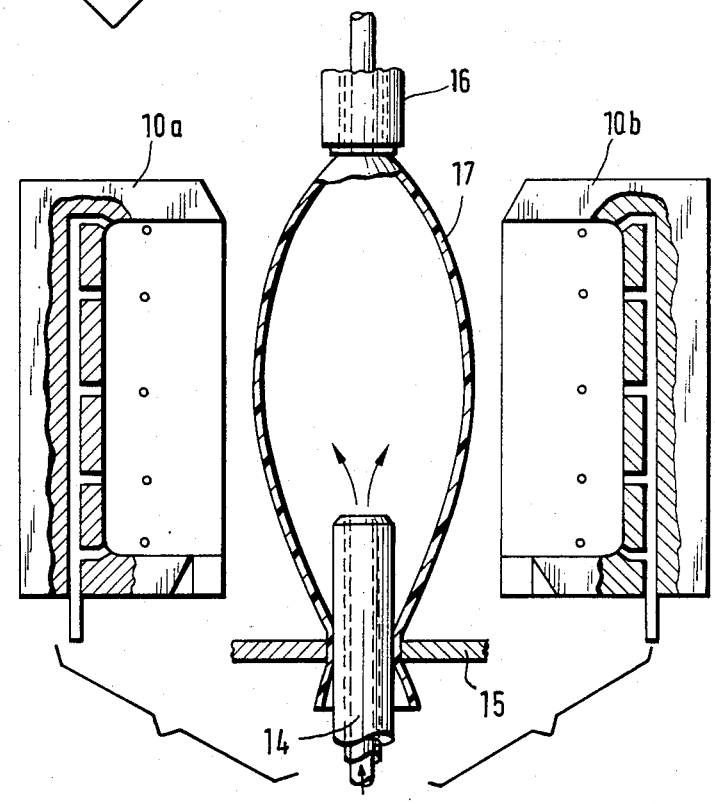

In many cases, more particularly when producing technical components and hollow bodies of substantial sizes, the preform 17 is pre-expanded before the blowing mold 10 is closed, in particular to ensure good and even wall thickness distribution in the finished article. As shown in FIG. 2b, that may be effected by the preform 17 being extruded over the blowing mandrel 14 and being closed around the blowing mandrel at its lower end, by being clamped by a suitable device as illustrated at 15. The pre-expansion operation can be effected using inert gas introduced by way of the conduit 42 and the blowing mandrel 14. It will be appreciated that it is also possible for that gas to be introduced into the preform 17 by way of the conduit 66 and the duct 20 in the extrusion head 16. The degree of preexpansion of the preform 17 may be controlled by way of a given level of pressure which provides the supply of gas over a defined period of time. Reference may now be made to FIG. 3 showing that the pre-expansion operation is carried out under a slightly higher gas pressure than during the step of extruding the preform.

Referring now to FIG. 2c, the blowing mold 10 is then closed around the pre-expanded preform. Shourtly before the operation of closing the blowing mold 10 is concluded, the actual blowing operation is begun, that is to say, inert gas is introduced into the preform 17 which has already been pre-expanded, by way of conduits 42 and blowing mandrel 14, with the inert gas being under a higher pressure, with the result that the preform is caused to bear against the wall of the mold cavity 12 over the entire internal surface thereof, and thus assumes the configuration defined by the inside wall surface of the mold cavity 12, which corresponds to the external configuration of the hollow body to be produced, as indicated at 72 in FIG. 2c. In the embodiment illustrated in FIG. 3, the operation of inflating the preform 17 within the blowing mold takes place in two pressure stages. In a first stage, the pressure is increased for example to about 2 bars and held at that pressure until the operation of forming one or more welded seams on the hollow body within the blowing mold has been definitively concluded. Thereafter, in the illustrated embodiment, the pressure is increased in the second stage to a value of about 6 bars. After the highest blowing pressure has been reached or in the course of attaining that pressure, plastic components which are to be mounted to the inner surface of the article are joined thereto as by welding. This phase also uses only inert gas as the blowing gas.

After the expansion operation has been concluded and, as indicated above, any components which are to be joined to the hollow body 72 have been secured in position as by welding or adhesive, the blowing gas is substantially removed from the hollow body 72 by a suitable reduction in the pressure in the interior 72 thereof. If, as is the case with the operating procedure illustrated by way of example in FIG. 3, the pressure within the hollow body 72 at the end of that operation is below ambient pressure, then it is necessary for a suitable reduced pressure to be caused to act from the outside on the hollow body 72 in the blowing mold 10, by way of conduit 26 and apertures 22 in the wall of the mold cavity 12, in order to ensure that the hollow body 72 which has not yet hardened or which has only partially hardened is not compressed or squashed under the effect of a higher external pressure. The evacuation operation within the blowing mold 10 is indicated diagrammatically by arrows 19 in FIGS. 2d and 2e.

After that, as shown in FIG. 2e, the reaction gas is introduced into the hollow body 72 in the blowing mold 10, under a pressure which is markedly below the pressure of the blowing gas. The residence time of the reaction gas in the hollow body depends on the time required for the desired reaction between the reaction gas and the inside wall surface of the hollow body 72, to render it impervious to fluid. If reference is now made to FIG. 3 of the accompanying drawings, it will be seen that a number of possibilities are illustrated therein by way of example. Thus, the pressure of the reaction gas may be about 3.5 bars. That would correspond to the upper boundary line of the hatches area shown in FIG. 3. However, it is also possible for the reaction gas to be introduced into the hollow body under a pressure which is below the ambient pressure, as indicated for example by the solid line defining the bottom edge of the hatched area in FIG. 3. In this case also, a suitable reduced pressure must be caused to act on the outside of the hollow body in the blowing mold 10, by way of the apertures 22, to prevent the hollow body from collapsing within the mold.

After the necessary reaction time which will depend on the materials involved and other operating parameters in a fashion with which the man skilled in the art will be familiar and which therefore does not need to be described in greater detail herein, as shown in solid lines in FIG. 3, the reaction gas is firstly removed from the hollow body 72 by a suitable reduction in pressure, possibly down to a value which is below ambient air pressure. Then, by supplying inert gas or another flushing gas, the pressure is increased to the usual blowing pressure of from 10 to 6 bars, that is to say, clearly above the pressure which obtained within the hollow body when the reaction gas was present. That causes substantial dilution of the residues of reaction gas which have still remained in the hollow body 72. There then follows a flushing and cooling phase which is carried out in the usual manner by constant circulatory flushing, that is to say, releasing or removing flushing and cooling gas from the hollow body, by way of an adjustable pressure valve, while at the same time feeding fresh gas into the hollow body to replace the gas removed. There is also the possibility shown in FIG. 3 of reducing the pressure of the flushing and cooling gas and increasing it again, at given intervals of time, in order in that way to intensify the internal cooling action. When dealing with complicated hollow bodies, cooling thereof by reducing and increasing the gas pressure at intervals will generally be preferred as the fluctuating pressure level means that the gas exchange and thus heat exchange effect by way of the gas is more intensive than when using the circulatory flushing mode. When using the latter, a high level of effectiveness in regard to flushing and cooling the molded article requires a properly defined air flow in the region of the wall of the hollow body to be cooled. However, when dealing with hollow bodies which are of an irregular and possibly contorted configuration, that is often difficult to achieve with circulatory flushing.

The interval-mode cooling procedure will be more desirable in particular in the second mode of operation shown in broken lines in the right-hand part of FIG. 3, in which the reaction gas in the hollow body 72 is not largely removed from the hollow body prior to the introduction of flushing and cooling gas by a reduction in pressure, but rather the reaction gas is substantially diluted by the flushing and cooling gas which is introduced by means of an increase in pressure. When using the abovementioned interval-mode cooling procedure, a considerable part of the reaction gas is already removed from the hollow body at the first reduction in pressure. In addition, in that case, cooling of the hollow body in the blowing mold 10 will occur more quickly, irrespective of the aspects to be considered in relation to the reaction gas. The amplitude of the intervalmode cooling procedure depends on the respective factors and parameters involved, in particular the internal volume of the hollow body and the cross-sections of the feed conduits and discharge conduits. The speed at which the flushing and cooling gas is removed from the hollow body decreases with decreasing pressure difference between the hollow body and ambient pressure.

Before the blowing mold is opened for the purposes of removing the hollow body, the internal pressure in the hollow body is reduced to ambient air pressure by way of the conduit 74 in the usual fashion.

If a reduced pressure had been applied between the exterior of the hollow body and the blowing mold, in order to prevent the hollow body from collapsing within the blowing mold, the vacuum source 28 is also cut off at the time at which the internal pressure in the hollow body is adjusted to ambient pressure, with the system associated with the vacuum source 28 also being brought to ambient pressure.

The reaction gas which is intended to react with the inside wall surface of the hollow body to render it at least substantially impervious to fluid or liquid will normally be fluorine. However, it will be appreciated that other reaction gases may also be employed.

It should be appreciated that the above-described embodiment was given only by way of example and illustration of the present invention and that various modifications and alterations may be made therein without thereby departing from the spirit and scope of the present invention. Thus for example gas pressures and times different from those illustrated for example in FIG. 3 may be employed, for example the flushing and cooling gas may be introduced into the hollow body under a pressure which is substantially at least equal to or higher than the gas pressure during the step of initially expanding the preform, or the maximum pressure of the flushing and cooling gas within the hollow body may be lower than the gas pressure used for intially expanding the preform.

What is claimed is:

1. A process for the production of hollow bodies of thermoplastic material by blow molding comprising: forming a preform; initially expanding the preform within a blowing mold using an inert gas under high pressure thereby to cause the preform to bear completely against the inside surface of the blowing mold; reducing the internal pressure in the hollow body; treating the inside wall surface of the resulting hollow body within the blowing mold by introducing a reaction gas into the interior of the hollow body under a pressure which is substantially lower than the pressure used for intially expanding the preform, said reaction gas reacting with the plastic forming the inside wall surface of said hollow body thereby to render same at least substantially impervious; and after the necessary reaction time replacing the reaction gas by a flushing and cooling gas for substantially removing reaction gas constituents within the hollow body and for cooling thereof.

2. A process as set forth in claim 1 wherein the internal pressure in the hollow body after expansion thereof is reduced to a value below the ambient pressure and at the same time a pressure at most equal thereto caused to act on the outside of the hollow body within the blowing mold.

3. A process as set forth in claim 2 wherein said pressure acting on the outside of said hollow body is lower than the internal pressure therewithin.

4. A process as set forth in claim 1 wherein said reaction gas is introduced into the interior of the hollow body under a pressure which is below atmospheric pressure.

5. A process as set forth in claim 1 wherein said reaction gas is substantially removed from the hollow body by a reduction in pressure before said flushing and cooling gas is introduced into the hollow body.

6. A process as set forth in claim 1 wherein said reaction gas is removed by introducing said flushing and cooling gas without the pressure being reduced therebefore.

7. A process as set forth in claim 1 wherein said flushing and cooling gas is introduced into the hollow body under a pressure which is substantially at least equal to the gas pressure during the step of initially expanding the preform.

8. A process as set forth in claim 6 wherein the pressure at which said flushing and cooling gas is introduced into said hollow body is higher than the gas pressure during the step of initially expanding the preform.

9. A process as set forth in claim 1 wherein the pressure of said flushing and cooling gas is reduced and increased again at intervals of time.

10. A process as set forth in claim 1 wherein the maximum pressure of said flushing and cooling gas within the hollow body is lower than the gas pressure for intially expanding the preform.

11. A process as set forth in claim 1 including working operations on the inside surface of the hollow body which is to be treated by the reaction gas, wherein said reaction gas treatment of the hollow body is begun only after the conclusion of said working operations.

12. A process as set forth in claim 11 wherein said working operations include a welding operation.

13. A process as set forth in claim 11 wherein said working operations include a glueing operation.

14. A process as set forth in claim 11 wherein said working operations are concluded before the operation of emptying the hollow body, before the reaction gas feed, is begun.

15. A process as set forth in claim 1 wherein said preform is at least substantially tubular.

* * * * *